(12) United States Patent
Parsell et al.

(10) Patent No.: US 8,892,896 B2
(45) Date of Patent: Nov. 18, 2014

(54) CAPABILITY AND BEHAVIOR SIGNATURES

(75) Inventors: Ryan D. Parsell, Langley, WA (US); Prabu Raju, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 904 days.

(21) Appl. No.: 12/684,329

(22) Filed: Jan. 8, 2010

(65) Prior Publication Data

US 2011/0173453 A1 Jul. 14, 2011

(51) Int. Cl.
*H04L 29/06* (2006.01)
*G06F 21/62* (2013.01)
*G06F 21/31* (2013.01)
*G06F 21/55* (2013.01)

(52) U.S. Cl.
CPC ...... *G06F 21/552* (2013.01); *G06F 2221/2147* (2013.01); *G06F 2221/2141* (2013.01); *G06F 2221/2101* (2013.01); *G06F 2221/2119* (2013.01); *G06F 21/6218* (2013.01); *G06F 21/316* (2013.01); *G06F 21/31* (2013.01)
USPC .......................................... 713/180; 713/168

(58) Field of Classification Search
CPC .......................... G06F 21/31; G06F 2221/2103
USPC .................................. 713/180, 168
See application file for complete search history.

(56) References Cited

U.S. PATENT DOCUMENTS

| | | | | |
|---|---|---|---|---|
| 5,899,999 | A * | 5/1999 | De Bonet | 1/1 |
| 6,195,698 | B1 * | 2/2001 | Lillibridge et al. | 709/225 |
| 7,376,970 | B2 | 5/2008 | Marinescu | |
| 2005/0120201 | A1 * | 6/2005 | Benaloh et al. | 713/155 |
| 2006/0174344 | A1 | 8/2006 | Costea et al. | |
| 2007/0240217 | A1 | 10/2007 | Tuvell et al. | |
| 2008/0201779 | A1 | 8/2008 | Tahan et al. | |
| 2009/0089869 | A1 * | 4/2009 | Varghese | 726/7 |

OTHER PUBLICATIONS

Baird et al. "ScatterType: a Reading CAPATCHA Resistant to Segmentation Attack", 2005, SPIE and IS&T, pp. 197-207.*
"User Behavior Analysis: Gaining Real-Time Cost-Effective Visibility into Who is Doing What, Where on your Network", Retreived at<<http://www.mcafee.com/us/local_content/solution_briefs/sb_mcafee_network_user_behavior_analysis.pdf,2009, pp. 6.
"SafenSec the Host-Based Intrusion Prevention System against Zero-Day Viruses and Hacker Attacks", Retreived at <<http://www.download3k.com/Press-Safe-n-Sec-the-Host-Based-Intrusion-Prevention.html>>, Nov. 12, 2009, pp. 3.
Ollmann, Gunter, "Serial Variant Evasion Tactics", Retreived at<<http://www.damballa.com/downloads/r_pubs/WP_SerialVariantEvasionTactics.pdf>>, 2009, pp. 1-15.

* cited by examiner

*Primary Examiner* — Hadi Armouche
*Assistant Examiner* — Dao Ho
(74) *Attorney, Agent, or Firm* — Bryan Webster; Kate Drakos; Micky Minhas

(57) ABSTRACT

Techniques for capability and behavior signatures are described. In one or more embodiments, various data describing the capabilities and behaviors of a client is collected. The collected data is analyzed to generate a signature that is indicative of whether the client is operated by a human or a non-human. Selective access to resources is provided to the client based at least in part on the signature that is generated.

20 Claims, 5 Drawing Sheets

CAPABILITY AND BEHAVIOR SIGNATURES

BACKGROUND

Through the Internet, web providers have made many types of web-based resources freely available to users, such as email accounts, search services, and instant messaging. Unfortunately, malicious entities may take advantage of freely available resources to use them for illegitimate and undesirable purposes, such as spamming, web attacks, and distribution of malicious software applications. To frustrate the efforts of these malicious entities, Human Interactive Proofs (HIPs) have been employed to selectively provide access to resources when the HIP determines that a given interaction came from a human. Doing so creates barriers to malicious entities that make use of automated systems to abuse or overuse freely available resources.

One traditional technique for a human interactive proof involves presenting a text-based puzzle. This technique involves challenging a computing device (e.g., a client) with a text-based puzzle when the computing device attempts to access resources. Typically, the answer to the puzzle is text within the puzzle that has been obfuscated in some manner to make it difficult for a computer to recognize. Recently, improvements in optical character recognition (OCR) as well as malicious attacks from "sweatshops" have all but defeated the viability of the traditional text-based puzzles for HIP. Accordingly, some traditional HIP techniques may no longer be capable of creating a successful barrier to malicious entities.

SUMMARY

Techniques for capability and behavior signatures are described. In one or more embodiments, various data describing the capabilities and behaviors of a client is collected. The collected data is analyzed to generate a signature that is indicative of whether the client is operated by a human or a non-human. Selective access to resources is provided to the client based at least in part upon the signature that is generated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
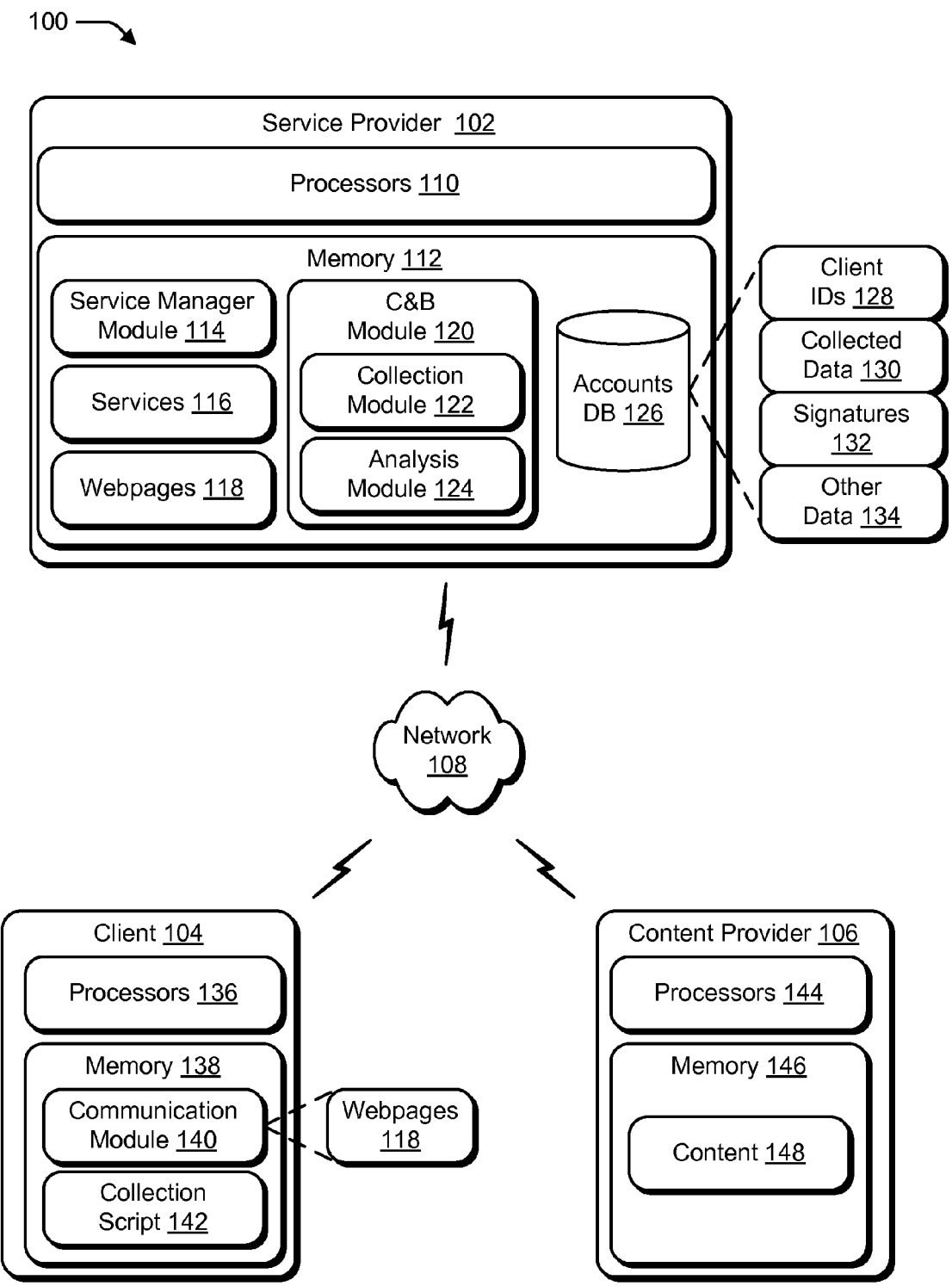
FIG. 1 is an illustration of an environment in an example implementation that is operable to provide capability and behavior signatures.

Service providers may employ human interactive proofs to prevent malicious entities from taking advantage of resources available from the service providers for illegitimate and/or undesirable purposes. Traditional techniques for human interactive proofs involve challenging a computing device (e.g., a client) with a text-based puzzle when the computing device attempts to access resources. Typically, the answer to the puzzle is text within the puzzle that has been obfuscated in some manner to make it difficult for a computer to recognize. Due to improvements in optical character recognition (OCR), though, traditional human interactive proof techniques may no longer be capable of creating a successful barrier to malicious entities.

Techniques for capability and behavior signatures are described. In one or more embodiments, various data describing the capabilities and behaviors of a client is collected. For example, a capability and behavior module of a service provider may cause a variety of tests of client processes to collect data from a client over a network. In at least some embodiments, the capability and behavior module may interact with a collection script that is deployed to the client to facilitate the data collection. The capability and behavior module may also analyze the collected data in various ways to generate a signature. The signature provides a succinct and consistent representation of the collected data that is indicative of whether the client is operated by a human or a non-human.

In particular, different signatures represent different combinations of evidence of human behavior that may be derived from the collected data. Based at least in part upon one or more signatures associated with a client, a service provider may selectively provide the client with access to resources that are available from the service provider. For example, access to resources may be fully or partially disabled for signatures that are indicative of non-human behavior. Likewise, resources may be fully or partially enabled for signatures that are indicative of human behavior. Access of a client to resources may be controlled in real-time for a current interaction and/or for subsequent interactions based on one or more signatures generated through the interactions. Selectively providing access to resources based on capability and behavior signatures may assist in preventing malicious entities from using automated tools (e.g., bots) to take advantage of freely available resources for illegitimate and undesirable purposes, such as spamming, web attacks, and virus distribution.

In the discussion that follows, a section entitled "Example Environment" describes an example environment and devices, which may be employed to provide capability and behavior signatures in various embodiments. Following this, a section entitled "Example Procedures" describes example techniques related to capability and behavior signatures in accordance with one or more embodiments. After that, a section entitled "Capability and Behavior Signature Implementation Examples" describes example implementation details of capability and behavior signatures that may be employed in one or more embodiments. Last, a section entitled "Example Devices" is provided and describes example devices that can be used to implement one or more embodiments.

Example Environment

FIG. 1 is an illustration of an example environment 100 that is operable to provide capability and behavior signatures. The illustrated environment includes one or more service providers 102, one or more clients 104, and one or more content providers 106 that are communicatively coupled, one to another, over a network 108. Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be configured to include multiple networks.

For the purposes of the following discussion, a referenced component, such as service provider 102, may refer to one or more entities, and therefore by convention reference may be made to a single entity (e.g., the service provider 102) or multiple entities (e.g., the service providers 102, the plurality of service providers 102, and so on) using the same reference number.

The service provider 102 may have one or more processors 110 and memory 112. Service provider 102 is depicted as storing a service manager module 114 in the memory 112 that is executable via the one or more processors 110. Service manager module 114 represents functionality operable by service provider 102 to manage various services 116 that may be made available over the network 108. For example, various services 116 may be provided via web pages 118 or other user interfaces that are communicated over the network 108 for output by the one or more clients 104. Service manager module 114 may manage access to the services 116, performance of the services 116, configuration of user interfaces or data to provide the services 116, and so on.

Some examples of services 116 include, but are not limited to, a search service, an email service to send and receive email, an instant messaging service to provide instant messages between clients 104, and a social networking service to facilitate connections and interactions between groups of users who share common interests and activities. Additional examples of services 116 include a shopping service, a weblog service, productivity service, authentication service, a news service, and an advertisement service to name a few.

The authentication service may be provided by the service manager module 114 to authenticate clients to access various services 116 that may be provided by one or more of the service providers 102. For example, a client 104 may provide a username and password that is authenticated by the authentication service. When the authentication is successful, the authentication service may pass a token or use other suitable authentication techniques to enable access to corresponding services 116. Authentication of the client 104 to an account may provide access to a single corresponding service provider 102 and/or service 116. Additionally or alternatively, a single authentication may correspond to many services 116, such that authentication to a single account provides access to many service providers 102 and/or to an entire suite of services 116.

Service provider 102 may include a capability and behavior (C&B) module 120 to implement aspects of techniques for capability and behavior signatures described herein. C&B module 120 is representative of functionality operable to at least collect various data from clients 104, derive evidence of human interaction from the collected data, and employ the evidence to categorize clients 104. In at least some embodiments, this may involve generating signatures configured to represent the evidence of human interaction that is derived. Such signatures may be employed to selectively provide resources (content and services) to clients 104. In the depicted example, C&B module 120 is illustrated as including a collection module 122 and an analysis module 124 as sub-modules that represent functionality of a service provider 102 that is operable to perform data collection and data analysis, respectively. Further discussion of the operation of C&B module 120 may be found in relation to the following figures.

The service manager module 114 may also manage an accounts database 126 that may be configured to store a variety of data related to user accounts with the one or more service providers 102. By way of example and not limitation, accounts database 126 may store client identifiers 128 that may be used for authentication and access control (e.g., unique account IDs, usernames, passwords, and so on). Accounts database 126 may also store collected data 130 and signatures 132 related to techniques for capability and behavior signatures described herein. A variety of other data 134 is also contemplated, including profile data that may correspond to personal data and pages accessible through various services 116, service authorizations, user preferences, program files such as documents and spreadsheets maintained online, and other data typically associated with user accounts. The signatures 132 associated with client identifiers 128 may be employed to selectively provide clients 104 access to services 116 and/or other resources available from the service providers 102.

The one or more clients 104 are depicted as having one or more processors 136 and memory 138. To enable various communications over the network 108, the one or more clients 104 may also include a communication module 140. The communication module 140 is depicted as being stored in memory 138 and is also executable via the processor 136 to provide various interactions with service providers 102 and/or services 116. Examples of such interaction include, but are not limited to, communicating one to another, navigating content, searching web pages, accessing services 116, interacting with content providers 106, accessing web pages 118 and other resources, instant messaging, e-mail, and so forth.

The communication module 140 may be implemented as a browser or other suitable application to obtain and output webpages 118 from the service provider 102 over the network 108. The communication module 136 may also represent a component of another application used to obtain one or more services 116 from the service providers 102. For example, a communication module 136 may be configured as a component of an email application, an instant messaging application, or other Web-enabled application of a client 104.

Communication module 140 may include or otherwise make use of a collection script 142. In particular, collection script 142 represents functionality operable to interrogate the client 104 with various process tests designed to collect data indicative of capabilities and behaviors of the client 104. Collection script 142 may further cause the results of such interrogation to be communicated to the service provider 102. As used herein, the collection script 142 represents a variety of kinds of script that may be configured using various scripting languages and techniques. For example, suitable scripting languages can include European Computer Manufacturer's Association (ECMA) Script, JavaScript, and VBScript to name a few. Service provider 102 may store the results as collected data 130 that is associated with a client identifier 128 of the client 104 in accounts database 126.

The one or more content providers 106 are depicted as having one or more processors 144 and memory 146. Memory 146 is depicted as storing content 148 that may be provided over the network 108 to the clients 104. In general, the content 148 is representative of various supplemental resources that may that may be included in webpages 118 and/or other user interfaces. By way of example, the content 148 stored by content providers 106 may include various combinations of text, video, ads, audio, media streams, animations, images, and so forth that may be requested and downloaded to supplement a webpage 118 when the webpage is rendered by a client 104.

Having considered devices and components of an example environment, consider now example procedures for capability and behavior signatures that may be implemented in the environment using the example components, as well as in other environments.

Example Procedures

The following discussion describes techniques for capability and behavior signatures that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to the example environment 100 of FIG. 1.

Figure 2:
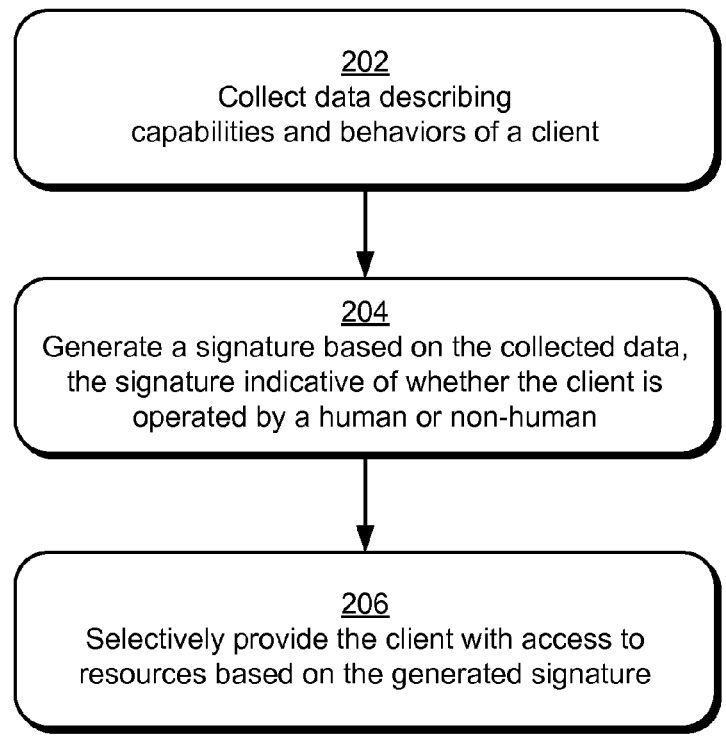
FIG. 2 is a flow diagram depicting an example procedure in which a capability and behavior signatures are generated.

FIG. 2 depicts a procedure 200 in an example implementation in which capability and behavior signatures are employed to control access to resources. In at least some embodiments, procedure 200 may be performed by one or more suitably configured servers, such as by servers associated with a service provider 102 of FIG. 1 that are configured to implement a capability and behavior (C&B) module 120. The C&B module 120 may be implemented as a component of a service module 114, or as a standalone component. Further, at least some of the functionality described in relation to the C&B module 120 may be provided by way of a collection script 142 that is communicated by the service provider 102 with a webpage or otherwise deployed to a client 104.

Data is collected that describes capabilities and behaviors of a client (block 202). One way this may occur is by way of a C&B module 120 executed by the service provider 102 of FIG. 1. C&B module 120 may be configured to communicate with a client 104 over the network 108 to examine capabilities and behaviors. In at least some embodiments the C&B module 120 may incorporate or otherwise make use of a collection module 122 configured to implement data collection aspects. This may involve interaction with the client using various process tests configured to interrogate the client and/or query the client for various information. Details regarding example process tests that may be employed to collect data related to client capabilities and behaviors may be found in relation to the following figures.

As noted, the collection module 122 represents functionality that may be implemented by a service provider 102 to enable data collection. In at least some embodiments, the collection module 122 may be configured to cause a collection script 142 to be communicated to the client 104. Collection script 142 may then be executed at the client 104 to collect various data and communicate the data back to the collection module 122 for storage and/or analysis.

A signature is generated based on the collected data (block 204). For instance, C&B module 120 may incorporate or otherwise make use of an analysis module 124 configured to implement data analysis aspects. In particular, the analysis module 124 represents functionality that may be implemented by a service provider 102 to analyze collected data 130 and generate a corresponding signature 132.

The signature 132 is configured to indicate whether the client is operated by a human or a non-human. The signature 132 may be configured in a variety of ways to convey information regarding the collected data 130. In at least some embodiments, the signatures 132 are designed as arbitrarily selected values that represent results of the collected data 130 in a succinct and consistent format. For instance, the signatures 132 may be represented using integers indicative of the presence or absence of one or more pieces of evidence of human interaction.

More particularly, Boolean values (e.g., on/off, one or zero, true/false, yes/no) may be assigned to indicate the present or absence of different pieces of evidence of human interaction that may be derived by operation of the analysis module 130 using the collected data 130. Accordingly, a particular signature 132 may correspond to a particular combination of Boolean values that is indicative of the presence or absence of the different pieces of evidence of human interaction. In at least some embodiments, different signatures 132 may be designated by integers that are constructed based on the Boolean values corresponding to different sets of evidence.

In a particular example, six different pieces of evidence may be derived from collected data 130 that is collected using various process tests configured to interrogate a client 104 and/or query the client for information. In this particular example, the signatures 132 may be represented as integers between 0 and 63 (e.g., $2^6$) based on different combinations of the Boolean values that may be associated with the six pieces of evidence. In particular, the six pieces of evidence may be assigned values of zero when the evidence is not present and values of 1, 2, 4, 8, 16, and 32 respectively when the evidence is present. Accordingly integers representing the different possible combinations of evidence, e.g., the signatures 132, may be derived by summing the values assigned to each of the six pieces of evidence.

Naturally, other examples may involve a fewer or a greater number of pieces of evidence and a variety of corresponding values (e.g., integers, letters, symbols, labels, and so forth) may be used to represent the different pieces of evidence. Further details and examples regarding configurations of signatures 132 in various embodiments may be found in relation to the following figures.

Access to resources is selectively provided to the client based on the generated signature (block 206). To enable selective provision of resources, signatures 132 that are derived in relation to block 204 may be associated with a client 104 and/or an account corresponding to the client 104. For example, signatures 132 may be stored in conjunction with client identifiers 128. The C&B module 120 may be employed to selectively provided resources to clients 104 based upon one or more signatures 132 that are associated with the clients 104. In particular, access to resources available from a service provider 102 may be denied or otherwise restricted for clients 104 that are associated with signatures 132 indicative of non-human interaction. Access to resources may be permitted for clients that are associated with signatures 132 indicative of human interaction. The selective provision of resources may be based at least in part upon various categories or ratings that may be assigned to the signatures, which is discussed in greater detail in relation to the following figures.

Figure 3:
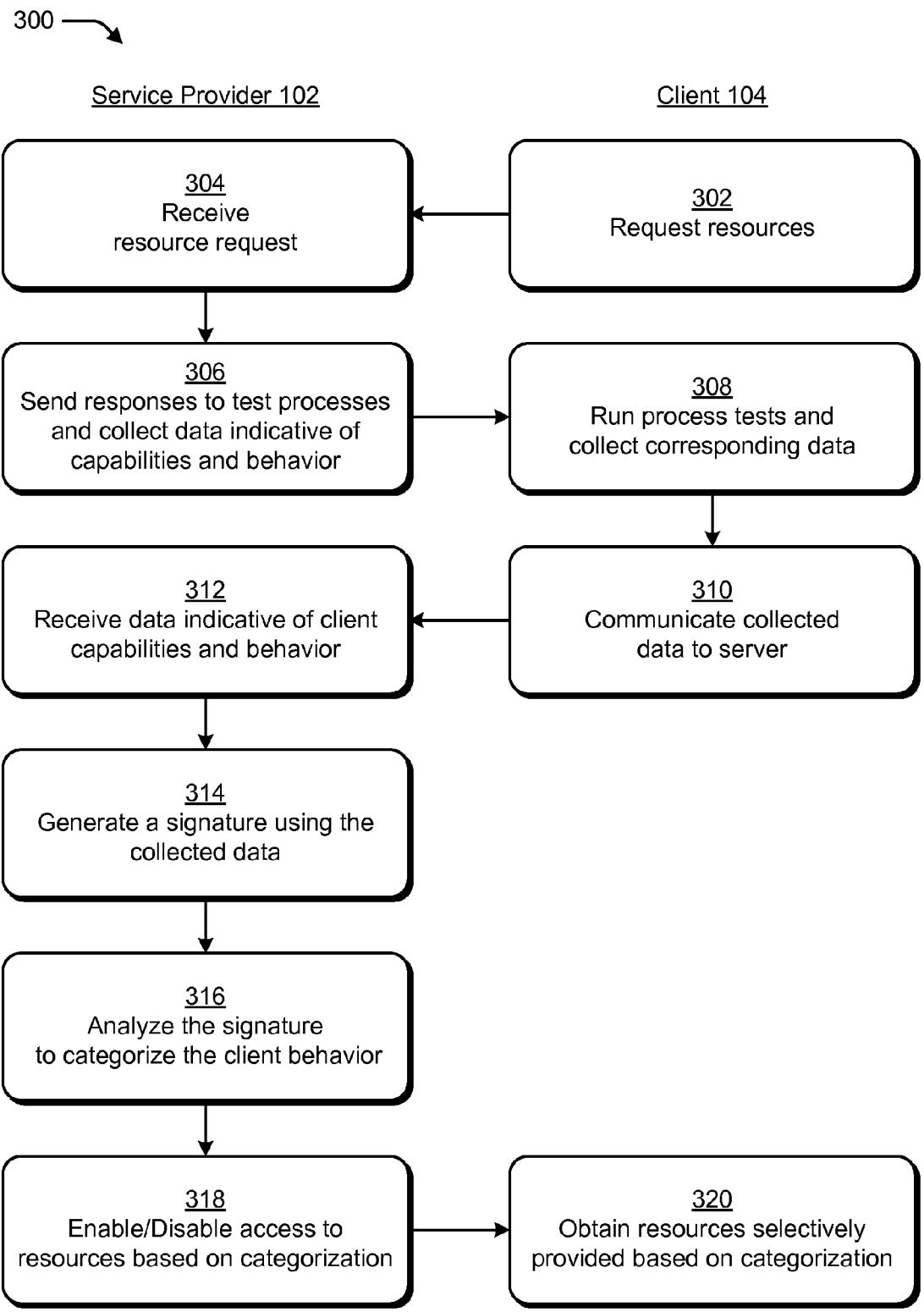
FIG. 3 is a flow diagram illustrating an example procedure for a system operable to implement capability and behavior signatures.

FIG. 3 is a flowchart illustrating an example procedure 300 for implementing capability and behavior signatures. Acts of procedure 300 illustrated on the left-hand side of FIG. 3 may be carried out by a service provider, such as service provider 102 of FIG. 1. Acts of procedure 300 illustrated on the right-hand side of FIG. 3 may be carried out by a client, such as client 104 of FIG. 1. For example, the acts may be performed by a browser, or other suitably configured communication module 136 of a client 104 that enables interaction with various webpages, or other UI's, that are provided at least in part over the network 108. To do so, the browser may include or otherwise make use of a collection script 142.

At the browser, a resource request is received (block 302). The request may be received from a user, may be a default request of the browser, may be received from another application, and so forth. The browser sends the request to the service provider for the requested resource. The service provider receives the resource request (block 304) and sends one or more responses configured to test processes of the client (block 306). The responses are configured to interrogate the client with various process tests to collect data that is indicative of various capabilities and behaviors of the client.

In at least some embodiments, processing that occurs to generate C&B signatures may be performed in parallel with servicing a request for resources. For instance, a requested resource may be communicated to the client concurrently with conducting the various process tests to gather evidence of human interaction and generate signatures. Additionally or alternatively, processing of the resource request may be suspended while process tests are performed. This may enable the results of the process tests to be used to selectively provide the requested resource to the client.

The browser receives the responses from the service provider and runs process tests that are defined by the responses to collect corresponding data (block 308). As a result of processing the responses, the browser may generate and collect various data indicative of capabilities and behaviors of the client. This may involve executing various process tests configured to interrogate the client to determine capabilities and behaviors. The data collected through the interrogation of the client is communicated by the browser to the service provider (block 310). At the service provider, the collected data that is communicated by the browser is received (block 312). In particular, collected data 130 may be obtained from a client 104 based upon the process tests and may be used to make an assessment regarding whether or not the client is operated by a human. A collection module 122 or comparable component of a service provider 102 may be employed, alone or in conjunction with a collection script 142 of a client 104, to obtain the collected data 130.

Based on the collected data, a signature is generated (block 314). For instance, an analysis module 124 or comparable component of a service provider 102 may be employed to generate a signature 132 based upon various pieces of evidence indicative of human interaction that are derived from the collected data 130. As discussed in relation to procedure 200 of FIG. 2, a signature 132 may be constructed using Boolean values assigned to indicate the presence or absence of the various pieces of evidence. Analysis module 124 may also cause the signature to be stored in association with a client 104, such as storing signatures 132 in conjunction with client identifiers in an accounts database 126.

Signatures associated with a client are analyzed to categorize the client behavior (block 316). For instance, client 104 may be categorized in a manner that indicates human or non-human behavior based upon one or more signatures 132 associated with the clients 104. One way this may occur is by operation of an analysis module 124 or other suitable component configured to correlate signatures 132 to categories. Categories that are correlated with signatures may be defined in a variety of ways to facilitate the categorization of clients 104. Generally, the categories represent different levels of confidence regarding whether or not the signatures 132 are indicative of human behavior. For instance, each signature and/or corresponding integer value representing the signature may be categorized according to a confidence that the signature is indicative of human behavior.

In at least some embodiments, categories are configured to provide direct conclusions regarding whether signatures 132 placed into the categories are considered related to human or non-human behavior. By way of example, the categories may include at least categories for human behavior and non-human behavior. Optionally, additional categories for suspect, undefined, and/or inconclusive behavior may also be included.

Additionally or alternatively, different signatures may be categorized using ratings on a relative scale that is configured to indicate a confidence level in human behavior. For example, different confidence levels may be expressed using categories such as no confidence, very low, low, suspect, undefined, medium, high, very high, and highest confidence. In another example, the categories may correspond to a numeric rating of confidence, such as values on a scale from 1 to 10. Various other categorizations suitable to express a confidence level in human behavior based on signatures 132 may also be employed.

The categorizations may be employed to enable or disable access of the client to resources (block 318). Accordingly, the client selectively receives resources that are provided on the basis of the categorizations (block 320). For instance, C&B module 120 or a comparable functionality of a service provider 102 may operate to selectively provide access to resources in accordance with the categorizations described above. This may involve enabling access when client behavior is categorized as being human and/or disabling access when client behavior is categorized as being non-human. Access to various resources may be partially or completely enabled and/or disabled accordingly to the categorizations.

Moreover, when confidence ratings on a relative scale are used for the categorizations, different levels of access may be provided for different levels of confidence. For example, complete access may be given for a signature assigned a rating of "high", partial access may be granted for a rating of "medium", restricted access may be provided for a "suspect" rating, and access may be completely disabled when a rating of "no confidence" is associated with a client 104. Further, a category associated with a client 104 may be used to discount intelligence information that is gathered for the client 104. For instance, tracking services used to gather telemetry data on user actions and behaviors may be configured to ignore data that is associated with clients 102 that are considered non-user driven. Thus, if a tracking service is configured to record the number of times an advertisement is viewed in order to provide accounting information to an advertisement customer, hits that are associated with non-user driven clients may be ignored or otherwise discounted in the tracking data. Accordingly, categorizations of signatures 132 may be employed in various ways to selectively provide clients 104 with access to resources.

Having considered example procedures related to capability and behavior signatures, consider now a discussion of example implementations of capability and behavior signatures that may be employed in one or more embodiments.

Capability and Behavior Signature Implementation Examples

Figure 4:
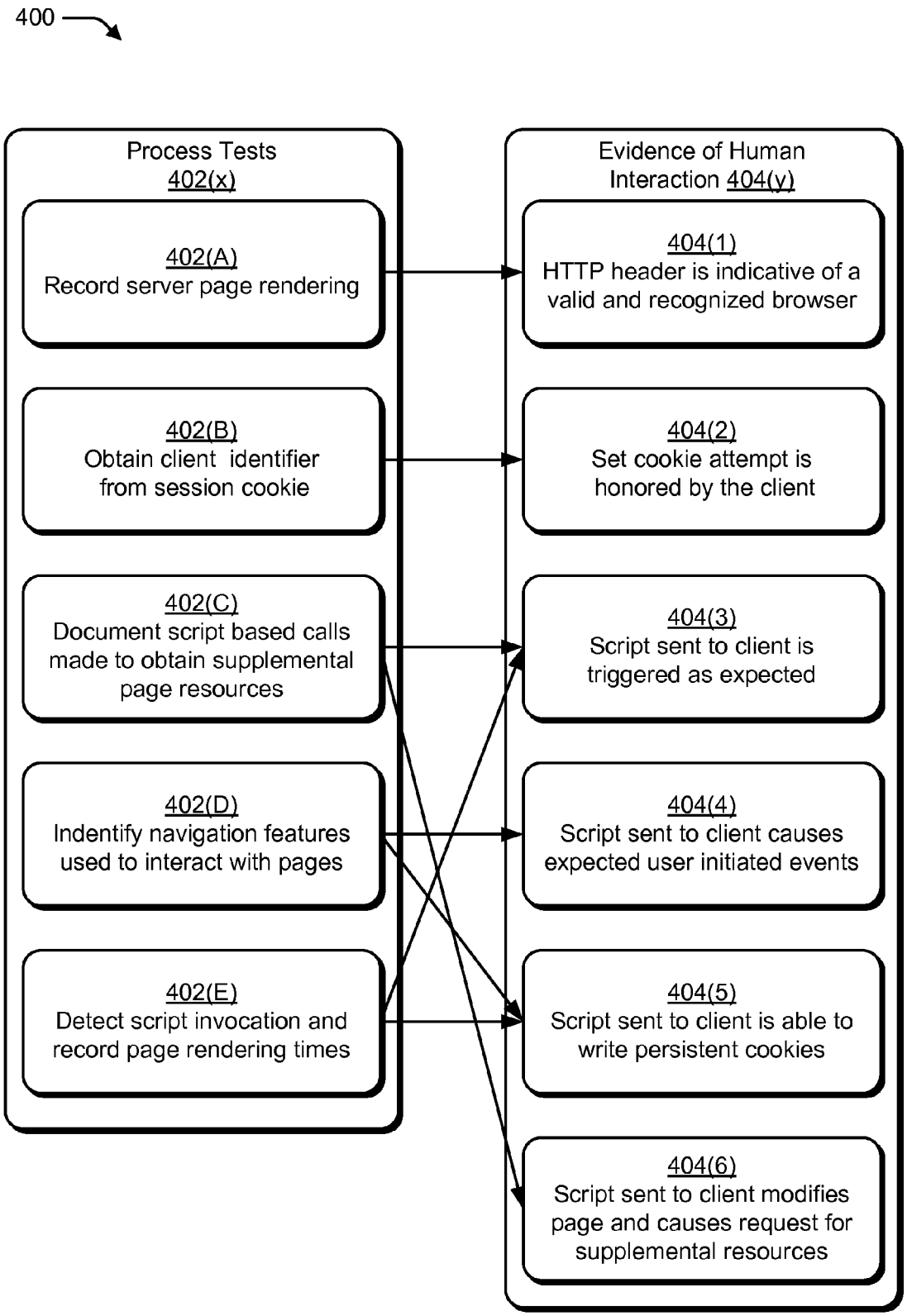
FIG. 4 is a diagram depicting an example implementation of capability and behavior signatures.

The following discussion describes example implementation details of capability and behavior signatures that may be employed in one or more embodiments. These implementation details are described in relation to an example implementation 400 as illustrated in FIG. 4. In particular, FIG. 4 illustrates an example mapping of example process tests 402(x) used to interrogate a client to evidence 404(y) of human interaction that may be derived from the example process tests 402(x). In the depicted example, five example process tests 402(x) of client processes are employed to interrogate a client and obtain corresponding collected data 130. The collected data that is obtained using the five example process tests 402(x) enables six different pieces of evidence 404(y) of human interaction to be derived. Different capability and behavior signatures may be generated based upon the presence or absence of the six pieces of evidence 404(y). As discussed herein, the signatures may be employed to selectively provide resources to clients 104.

It is noted that the example of FIG. 4 illustrates process tests 402(x) that produce six pieces of evidence 404(y) by way of example and not limitation. It is contemplated and to be appreciated that various other combinations, types, and numbers of process tests 402(x) may be employed to produce various combinations, types, and numbers of corresponding pieces of evidence 404(y).

Process Tests and Evidence of Human Interaction

The data collection techniques discussed herein may involve various tests of client processes and behaviors that may provide evidence of human interaction. The evidence derived through the process tests may in turn be employed to categorize clients as being operated by humans or non-humans. By way of example, a variety of examples of process tests 402(x) that may be used by collection module 122 to obtain various collected data 130 are illustrated in FIG. 4. Different combinations of the example process tests 402(x) may be employed to interrogate different clients. The example process tests 402(x) may be used to derive evidence 404(y) of human interaction, as illustrated by the arrows mapping process tests 402(x) to evidence 404(y) of human interaction in FIG. 4. In the following portion, example process tests 402(x) and corresponding pieces of evidence 404(y) are described in relation to acts that may be performed in the course of collecting and analyzing data to generate capability and behavior signatures.

In particular, at act 402(A) rendering of server pages by a client is recorded. This may involve receiving and processing HTTP get requests from a client 104 for server pages. The HTTP get requests should be configured in a recognized format. Moreover, the client 104 should produce headers that include expected identifiers, such as a device identifier and a browser identifier. Headers may also enable a service provider to choose different signature mappings based upon client types, processing capabilities, and so forth. By way of example, if a header indicates that a request is from a mobile phone, the service provider 102 may expect that the mobile phone will produce certain script errors and accordingly may select a mapping that ignores such script errors. Non-human operated clients (bots), though, may use unexpected formats and/or omit expected identifiers. Accordingly, act 402(A) collects data to examine whether HTTP headers in requests and responses are formatted and handled as expected. Act 402(A) produces evidence 404(1) regarding whether HTTP headers are indicative of a valid and recognized browser that provides and handles headers as expected.

Act 402(B) obtains a client identifier from a session cookie. More particularly, an attempt may be made to cause a client 104 to honor a set cookie request from the service provider 102. It is expected that human operated clients (e.g. non-malicious) will honor the request and return the client identifier. On the other hand, non-human operated clients (bots) may not honor request and omission of the client identifier may be considered suspect. Accordingly, act 402(B) collects data to determine whether a client identifier is provided as expected. Act 402(B) produces evidence 404(2) regarding whether a set cookie attempt is honored by the client 104 to return a requested client identifier.

Act 402(C) documents script based calls to obtain supplemental page resources. Script that is communicated to a client 104 in a webpage should be executed as expected when the webpage is rendered. Often, a webpage may include script-based beacons that enable dynamic modifications to HTML describing the page after the page is initially rendered. For instance, modifications may be made to obtain content 148 from content providers 106 to customize a page based upon user identity, activities, or preferences. Serving targeted ads is one example of such dynamic modifications.

It is expected that human operated clients (e.g. non-malicious) will respond to the script-based beacons by correctly sourcing another HTTP Get request from the service provider 102 to obtain the supplemental page resources. On the other hand, non-human operated clients (bots) may ignore or incorrectly process script-based beacons and an unexpected response to the script-based beacons may be considered suspect. Accordingly, act 402(C) collects data to determine whether script based calls to obtain supplemental page resources are handled by a client as expected. Act 402(C) may produce evidence 404(3) regarding whether script sent to client 104 is triggered as expected. Act 402(C) also produces evidence 404(6) regarding whether script sent to client 104 modifies a webpage and causes a request for supplemental resources as expected.

Act 402(D) identifies navigation features used to interact with pages. This may involve examining and/or setting cookies that are used to record various inputs that are employed to interact with pages at the client 104. Various navigation events such as mouse movements, link selection, keyboard input, and so forth may be recorded in a persistent cookie. In at least some embodiments, script that is communicated to a client 104 may be configured to cause expected navigation events that are indicative of human interaction. Distinctions between human and non-human behavior may be made based upon the navigation features that are identified. Further, non-human operated clients (bots) may fail to record or prevent recording of navigation features in a persistent cookie. Absence of recording navigation features in a persistent cookie may be considered suspect. Accordingly, act 402(D) collects data to indentify navigation features employed by a client 104. Act 402(D) produces evidence 404(D) regarding whether script sent to client 104 causes expected user initiated events. Act 402(D) may also produce evidence 404(5) regarding whether script is able to write persistent cookies as expected.

Act 402(E) detects invocation of script included in a webpage and records page rendering times. When a page is being rendered, script instructions sent to a client 104 should be triggered as expected. Moreover, page rendering times may be examined to determine if the webpage was rendered correctly. Unexpected rendering times may indicate that malicious code has been executed to modify or otherwise interfere with expected execution of the webpage. Rendering times may be recorded in a persistent cookie. Similar to the previous example, non-human operated clients (bots) may fail to record or prevent recording of rending times in a persistent cookie and absence of the rendering times may be considered suspect. Accordingly, act 402(E) collects data that describes invocation of script and records rendering times. Act 402(E) may produce evidence 404(3) regarding whether script 104 sent to client is triggered as expected. Act 402(E)

may also produce evidence 404(5) regarding whether script is able to write persistent cookies as expected.

Signatures

Various evidence 404(y) that is derived from process tests 402(x) as described above may be used to generate corresponding signatures 132. The signatures 132 may be configured as a combination of Boolean values that indicate the present or absence of the evidence 404(y). Table 1 below depicts example signatures 132 that may be generated using the six pieces of evidence 404(y) in the preceding example.

the example in Table 1, may be constructed and applied to selectively control access of clients 104 resources. Using different signatures tables provides a way to compensate for different types of valid human driven clients that may be encountered, and that may cause false positives for non-human interaction in some scenarios.

As can also be seen in Table 1, some missing evidence does not necessarily indicate that a service provider 102 is interacting with non-human driven client 104. Additionally, some of the signatures 132 may be used to directly categorize a

TABLE 1

Example C&B Signatures

| | | | Process Tests | | | | | Evidence Derived | | | | | |
|---|---|---|---|---|---|---|---|---|---|---|---|---|---|
| ID | Category | Description | A | B | C | D | E | 1 | 2 | 3 | 4 | 5 | 6 |
| 63 | Human | Normal for navigation around application | x | x | x | x | x | x | x | x | x | x | x |
| 54 | Human | Normal for viewing of initial or single page | | x | x | | x | | x | x | | x | x |
| 55 | Human | Navigation not recorded-link on page not instrumented | x | x | x | x | | x | x | x | | x | x |
| 63 | Human | Script rendering error-page events not recorded | x | x | | x | x | x | x | x | x | x | x |
| 31 | Suspect | Script error prevented beacon from being sent | x | x | | x | x | x | x | x | x | x | |
| 3 | Suspect | Persistent cookie was not set | x | x | | | | x | x | | | | |
| 2 | Non-Human | Page request/rendering failed-no evidence of rendering | | x | | | | | x | | | | |
| 19 | Non-Human | Uncommon script error-page modification events missing | x | x | | x | | x | x | | | x | |
| 38 | Suspect | Private browsing mode is being used | x | x | | x | | | x | x | | | x |
| 39 | Non-Human | Uncommon script error-rendering and action driven events missing | x | x | x | | | x | x | x | | | x |
| 23 | Non-Human | Uncommon script error-links selected w/o user event | x | x | | | x | x | x | x | | x | |

Table 1 illustrates different signatures 132 that may be generated using different combinations of process tests 402(x) (represented in columns "A" to "E") and corresponding evidence 404(y) (represented in columns "1" to "6"). Evidence 404(y) that is present is associated with a positive or true Boolean value represented by an "x" in the corresponding column, and evidence that is missing and/or could not be obtained is represented by blanks Process tests 402(x) used to produce the evidence are also represented by an "x" in corresponding columns of Table 1.

As noted above, integers representing the different possible combinations of evidence, e.g., the signatures 132, may be derived by summing values assigned to each of the six pieces of evidence. Table 1 illustrates example integers in the "ID" column of table 1. In this example, pieces of evidence depicted in Table 1 are assigned values of zero when the evidence is missing (no "x") and are assigned values of 1, 2, 4, 8, 16, and 32 for columns 1, 2, 3, 4, 5, and 6 respectively when the evidence is present ("x" appears in corresponding column). Accordingly, a value of 54 is obtained for the second signature in Table 1 by adding 2, 4, 16, and 32. Likewise a value of 23 appears for the last signature in Table 1, which is obtained by adding 1, 2, 4, and 16.

Table 1 also includes a "Category" column that represents categorizations that have been associated with the signatures 132. In this example, the categories include human, non-human, and suspect. Table 1 also includes a "Descriptions" column that may include various annotations and/or explanations of the signatures 132. Various signature tables, such as client 104 as human or non-human. For example, Table 1 categorizes the two signatures having the ID of 63 as being human driven and signatures with IDs of 2 and 19 as being non-human driven.

Signature Monitoring

As just described, categorization of a client 104 in some cases is based on a single signature 132. In other cases, one or more signatures obtained through multiple interactions with a client 104 may be considered in determining how to categorize the client 104. In at least some embodiments, C&B module 120 is configured to collect and monitor signatures 132 for multiple interactions with a client 104. Multiple signatures 132 obtained through these interactions may be analyzed together to assess whether the observed client behavior is human or non-human. Further, a configurable threshold for a number of "non-human" interactions may be established. For instance, if a threshold value of five is set, then classification of client 104 as being non-human driven may be made when five or more signatures associated with non-human interaction are collected and/or associated with the client 104.

By way of example, consider signatures in Table 1 above that are categorized as suspect. The suspect category may be used for signatures 132 that are designated as insufficient to make direct conclusions regarding whether a client is human or non-human. Signatures 132 categorized as suspect may cause further observations over a period of time to categorize the clients 104 that generate the signatures 132. In particular, clients 104 that produce signatures 132 categorized as suspect may be watched over a series of requests to the service provider 102. A client 104 that is human driven would not be expected to repeatedly generate suspect signatures over multiple page views. On the other hand, repeated generation of one or more suspect signatures 132 may be indicative of client 104 that is non-human driven. Accordingly, monitoring of signatures 132 over a period of time and/or multiple interactions may assist in distinguishing between human and non-human behavior in some scenarios.

Having considered example implementation details related to capability and behavior signatures, consider now a discussion of an example device that may be configured to implement aspects of capability and behavior signatures in one or more embodiments.

Example Device

Figure 5:
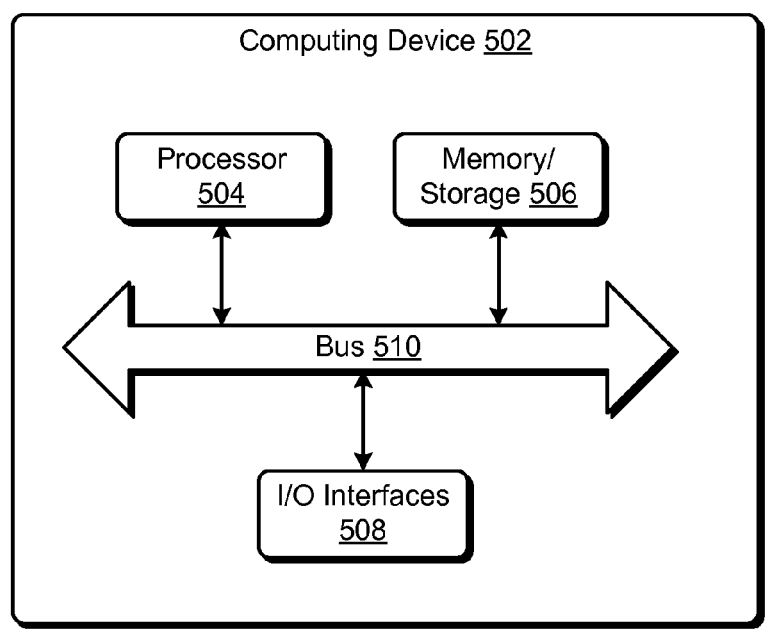
FIG. 5 is an illustration of an example device in accordance with one or more embodiments.

FIG. 5 illustrates generally at 500 an example computing device 502 that may implement the various embodiments described above. The computing device 502 may be, for example, a client 104 of FIG. 1, a server of a service provider 102, a server of an content provider 106, or any other suitable computing device.

The computing device 502 includes one or more processors or processing units 504, one or more memory and/or storage components 506, one or more input/output (I/O) interfaces 508 for input/output (I/O) devices, and a bus 510 that allows the various components and devices to communicate one to another. The bus 510 represents one or more of several types of bus structures, including a memory bus or memory controller, a peripheral bus, an accelerated graphics port, and a processor or local bus using any of a variety of bus architectures. The bus 508 can include wired and/or wireless buses.

The memory/storage component 506 represents one or more computer storage media. The memory/storage component 506 may include volatile media (such as random access memory (RAM)) and/or nonvolatile media (such as read only memory (ROM), Flash memory, optical disks, magnetic disks, and so forth). The memory/storage component 506 may include fixed media (e.g., RAM, ROM, a fixed hard drive, etc.) as well as removable media (e.g., a Flash memory drive, a removable hard drive, an optical disk, and so forth).

The one or more input/output interfaces 508 allow a user to enter commands and information to computing device 500, and also allow information to be presented to the user and/or other components or devices using various input/output devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer-readable media. The computer-readable media may include a variety of available medium or media that may be accessed by a computing device. By way of example, and not limitation, computer-readable media may comprise "computer-readable storage media."

Software or program modules, including the C&B module 120, communication module 136, service manager module 114, collection script 142, and other program modules, may be embodied as one or more instructions stored on computer-readable storage media. The computing device 502 may be configured to implement particular functions corresponding to the software or program modules stored on computer-readable storage media. Such instructions may be executable by one or more articles of manufacture (for example, one or more computing device 502, and/or processors 504) to implement techniques for capability and behavior signatures, as well as other techniques. Such techniques include, but are not limited to, the example procedures described herein. Thus, computer-readable storage media may be configured to store instructions that, when executed by one or more devices described herein, cause various techniques for capability and behavior signatures.

The computer-readable storage media includes volatile and non-volatile, removable and non-removable media implemented in a method or technology suitable for storage of information such as computer readable instructions, data structures, program modules, or other data. The computer-readable storage media can include, but is not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or another tangible media or article of manufacture suitable to store the desired information and which may be accessed by a computer.

CONCLUSION

Although capability and behavior signatures have been described in language specific to structural features and/or methodological acts, it is to be understood that the appended claims are not necessarily limited to the specific features or acts described. Rather, the specific features and acts are disclosed as example forms of implementing the techniques for capability and behavior signatures.

What is claimed is:

1. A method comprising:

communicating, by a service provider that is implemented at least partially in hardware, a collection script configured for deployment on a client device, the collection script deployed to enable the service provider to interact with the client device to test one or more processes performed by the client device;

collecting test results through the collection script, the test results comprising multiple indications of capabilities and behaviors of the client device indicative of whether or not the client device is operated by a human or a non-human;

generating a signature by combining numeric values that are assigned to multiple pieces of evidence of human interaction, each of the numeric values designating a presence or absence of a piece of evidence as determined by an analysis of the multiple indications;

associating the client device with a rating on a relative scale that indicates a confidence level of the client device being operated by a human or a non-human based on evaluation of the signature; and selectively providing the client device with access to resources available from the service provider according to the rating.

2. A method as described in claim 1, wherein interaction of the service provider with the client device involves communication over a network to test the one or more processes performed by the client device.

3. A method as described in claim 2, wherein the generating of the signature comprises determining the presence or absence of the multiple pieces of evidence of human interaction based upon the analysis of the multiple indications.

4. A method as described in claim 1, wherein the signature is configured as an integer indicative of the presence or absence of the multiple pieces of evidence of human interaction as determined through the analysis of the multiple indications.

5. A method as described in claim 1, wherein the generating of the signature comprises:
- analyzing the multiple indications to determine the presence or absence of the multiple pieces of evidence of human interaction;
- assigning the numeric values to the multiple pieces of evidence to designate the presence or absence of the multiple pieces of evidence of human interaction, the numeric values assigned to the multiple pieces of evidence comprising Boolean values; and
- constructing the signature as an integer that represents the combination of Boolean values assigned to the multiple pieces of evidence.

6. A method as described in claim 5, wherein the constructing of the signature as the integer comprises assigning the numeric values to each of the multiple pieces of evidence and obtaining the integer by summing the numeric values assigned to each of the multiple pieces of evidence that is determined to be present.

7. A method as described in claim 1, wherein the selectively providing the client device with access to resources comprises disabling access of the client device to at least some resources when the rating indicates that the client device is operated by a non-human.

8. A method as described in claim 1, wherein the selectively providing the client device with access to resources comprises enabling access of the client device to at least some resources when the rating indicates that the client device is operated by a human.

9. A method as described in claim 1, further comprising:
- categorizing the client device as being operated by a human or a non-human according to the rating; and
- selectively providing the resources to the client device based in part on the categorizing of the client device.

10. A method as described in claim 1, further comprising:
- determining the confidence level based at least in part upon the signature; and
- associating the client device with the rating using the confidence level that is determined.

11. Computer-readable memory comprising instructions that, responsive to execution by one or more computing devices, cause the one or more computing devices to perform acts including:
- deploying a script on a client configured to test one or more processes performed by the client when the client requests resources from a service provider, results of the testing comprise multiple indications of capabilities and behaviors of the client indicative of whether or not the client is operated by a human or a non-human;
- collecting the multiple indications of the capabilities and behaviors of the client;
- analyzing the collected indications to determine whether multiple pieces of evidence of human interaction with the client are present in the collected indications, the analyzing including comparing the multiple indications of the capabilities and behaviors of the client to expected capabilities and behaviors of the client associated with human interaction;
- assigning numeric values to each of the multiple pieces of evidence of human interaction with the client, each of the numeric values designating a presence or absence of a piece of evidence as determined by the analyzing of the collected indications;
- generating a signature as an integer that represents the combination of numeric values assigned to the multiple pieces of evidence that are present in the collected indications, the signature evaluated to determine a confidence level that the client is being operated by a human or a non-human; and
- associating the client with a rating on a relative scale corresponding to the confidence level that is determined.

12. Computer-readable memory as described in claim 11, wherein the one or more processes of a client that the script is configured to test comprise one or more of:
- recording a rendering of one or more webpages by the client;
- attempting to obtain a client identifier from a session cookie;
- documenting script based calls made by the client to obtain supplemental resources for the one or more webpages;
- identifying navigation features used to interact with the one or more webpages; or
- detecting invocation of script and recording page rendering times.

13. Computer-readable memory as described in claim 11, wherein the multiple pieces of evidence of human interaction with the client include one or more of:
- headers included in page requests from the client that are indicative of a valid and recognized browser;
- honoring, by the client, of an attempt to set a cookie to provide a client identifier;
- triggering of script based instructions sent to the client without error;
- identifying particular user initiated events responsive to sending script to the client to cause the particular user initiated events;
- successfully writing of a persistent cookie by script sent to the client to write the persistent cookie; or
- successfully modifying a webpage and causing a request from the client for supplemental resource with script sent to the client to modify the webpage.

14. Computer-readable memory as described in claim 11, wherein the instructions, responsive to execution by the one or more computing devices, further cause the one or more computing devices to store the generated signature in association with a client identifier in an accounts database.

15. Computer-readable memory as described in claim 11, wherein the instructions, responsive to execution by the one or more computing devices, further cause the one or more computing devices to perform acts of:
- categorizing the client as being operated by a human or a non-human according to the rating; and
- selectively providing the client with access to resources based in part on the categorizing of the client.

16. Computer-readable memory as described in claim 11, wherein the instructions, responsive to execution by the one or more computing devices, further cause the one or more computing devices to perform acts of
- selectively providing the client with access to resources according to the rating that is associated with the client.

17. Computer-readable memory as described in claim 11, wherein the instructions, responsive to execution by the one or more computing devices, further cause the one or more computing devices to perform acts of:
- designating the client as suspect according to the rating; and initiating monitoring of multiple interactions with the client to assist in making a subsequent determination regarding whether the client is operated by a human or a non-human.

18. A system comprising:

one or more processors implemented at least partially by hardware; and one or more computer-readable storage media storing instructions that, responsive to execution via the one or more processors, cause the system to perform acts to determine a confidence level that a client is being operated by a human or a non-human, the acts including:

collecting data describing capabilities and behaviors of the client when the client requests resources from a service provider, the collected data comprising results derived from testing one or more processes performed by a client and initiated by interaction of the service provider with the client that causes the client to perform the one or more processes, the one or more processes including one or more of: recording rendering of one or more webpages by the client; attempting to obtain a client identifier from a session cookie; documenting script based calls made by the client to obtain supplemental resources for the one or more webpages; identifying navigation features used to interact with the one or more webpages; or detecting invocation of script and recording page rendering times;

analyzing the collected data to determine whether one or more expected pieces of evidence of human interaction with the client are present in the collected data, the one or more pieces of evidence including one or more of: headers included in page requests from the client that are indicative of a valid and recognized browser; honoring, by the client, of an attempt to set a cookie to provide a client identifier; triggering of script based instructions sent to the client without error; identifying particular user initiated events responsive to sending script to the client to cause the particular user initiated events; successfully writing of a persistent cookie by script sent to the client to write the persistent cookie; or successfully modifying a webpage and causing a request from the client for supplemental resource with script sent to the client to modify the webpage; and constructing an integer to represent the signature by combining numeric values that are each assigned to the one or more expected pieces of evidence of human interaction with the client, each of the numeric values designating the presence or absence of a piece of evidence as determined by the analyzing of the collected data, the signature evaluated to determine the confidence level which enables the client to be associated with a rating on a relative scale, the rating used to selectively provide the client with access to resources available from a service provider.

19. A system as described in claim 18, wherein constructing the integer comprises summing the numeric values assigned to each of the pieces of evidence of human interaction with the client, the numeric values comprising Boolean values.

20. A system as described in claim 18, wherein the one or more processors are implemented via one or more server devices of the service provider, the service provider configured to selectively provide resources over the network to the client based at least in part upon the rating.

* * * * *